J. P. RATHBUN

Nov. 5, 1929. HEAT EXCHANGER Re. 17,480

Original Filed Oct. 28, 1927

WITNESSES:
E. Lutz.

INVENTOR
J. P. Rathbun
BY
A. B. Davis
ATTORNEY

Reissued Nov. 5, 1929 Re. 17,480

UNITED STATES PATENT OFFICE

JOHN P. RATHBUN, OF MOORES, PENNSYLVANIA, ASSIGNOR TO WESTINGHOUSE ELECTRIC & MANUFACTURING COMPANY, A CORPORATION OF PENNSYLVANIA

HEAT EXCHANGER

Original No. 1,706,031, dated April 9, 1929, Serial No. 229,447, filed October 28, 1927. Application for reissue filed April 18, 1929. Serial No. 356,285.

My invention relates to tubular heat exchangers such as surface condensers, liquid heaters, coolers, and the like, and it has for an object to improve the construction of apparatus of this class.

In the operation of heat exchange apparatus of the type described, it becomes necessary from time to time to remove the tube bundle for inspection, cleaning, repairs, or the like, and for these purposes, it is desirable that the tube bundle be removable as a unit.

Heretofore, the removal of the tube bundle from heat exchangers of this class has been attended with considerable inconvenience, particularly with condenser type heaters, due largely to the arrangement of the air baffles. These baffles are employed for the purpose of providing a separate cooling zone through which air and other uncondensed media may pass previous to removal through the air removal connection.

Such baffles are commonly secured to the shell of the exchanger, above the air removal connection, and extend into the nest of tubes so as to compel gaseous media to pass through the nest and around the end of the baffle, and thus, to ensure maximum heat transfer and to prevent gaseous media from by-passing around some of the tubes and along a wall of the shell to the removal connection. Since these baffles extend into the nest between the tube sheets and the tube supports, the tube bundle cannot be removed as a unit unless some provision is made for taking the baffles out of the way, or for removing them with the tube bundle. The problem of removing the baffles with the tube bundle is further complicated by the possibility of having a loose joint between the shell and the baffle, which would permit the by-passing of gaseous media from the inlet of the shell directly to the air removal connection, thus short circuiting some of the tubes.

Furthermore, in exchangers of the movable header type, it is desirable to have means which will relieve the tubes of the bending stresses due to the weight of the bundle and at the same time will not interfere with the expansion and contraction of the tubes.

More particularly, therefore, an object of my invention is to provide a movable header, condenser type heater with a tube bundle which may be readily withdrawn as a unit, and in which adequate provision shall be made for removing the air baffles with the tubes and for preventing by-passing of gaseous media to the air removal connection and for relieving the tubes of unnecessary stresses during operation.

Apparatus embodying the features of my invention is shown in the accompanying drawings forming a part of this specification, wherein.

According to my invention, the air baffles are secured to the tube sheets and to the tube supports, and means are provided for maintaining a hydrostatic seal between the baffles and the shell of the exchanger, so as to prevent by-passing of gaseous media to the air removal connection. The hydrostatic seal is automatically formed and thus, it is unnecessary to loosen any bolts or other connections before removing the baffles with the tube bundle.

I also provide stays of sufficient rigidity to prevent flexure of the tubes due to the weight of the tube bundle, and the stays which are secured to the movable header are provided with extensible portions which do not interfere with their rigidity.

Figure 1:
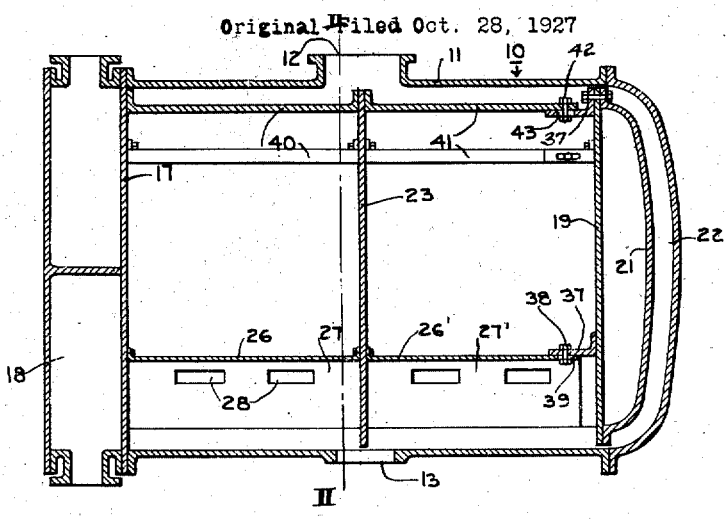
Fig. 1 is a longitudinal section of a tubular heat exchanger with the tubes removed.
Figure 2:
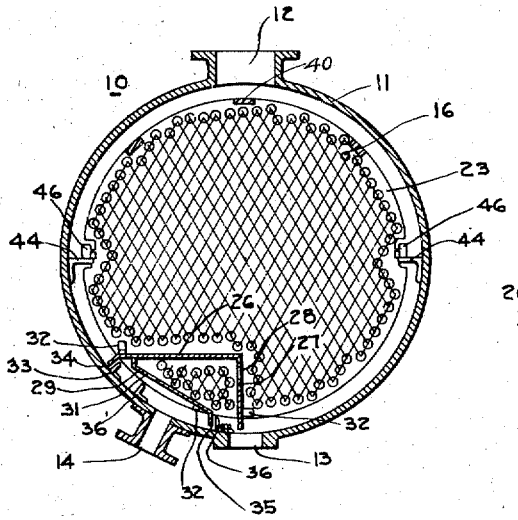
Fig. 2 is a transverse section along the line II—II of the heat exchanger shown in Fig. 1.

Referring now to the drawings for a better understanding of my invention, in Figs. 1 and 2, I show a multi-pass, condenser type heater indicated generally at 10, and comprising a shell 11, having an inlet for gaseous media at 12, an outlet for condensate at 13, and an air and non-condensable gas outlet at 14. Extending longitudinally within the shell 11 is a nest of tubes 16, the latter being provided with a fixed tube sheet 17 which is disposed adjacent the inlet and discharge water box 18, and a movable tube sheet 19 for the other end of the nest. A return header 21 is secured to the movable tube sheet 19 in any approved manner, and a cover 22 is provided for closing this end of the shell. I may also arrange a suitable tube support 23 intermediate the tube sheets for preventing the tubes from sagging, and it will be understood that while I have shown only one tube support, that more than one may be provided, as conditions may require.

I also provide means for enclosing some of the tubes in a separate cooling chamber for cooling air and other non-condensable, or uncondensed gases previous to their removal through the air removal connection 14. The portion of this chamber which extends between the tube support 23 and the fixed tube sheet 17 is formed of a horizontal baffle member 26, which extends transversely into the tube nest and is joined longitudinally to a substantially vertical baffle member 27, which is disposed above the condensate outlet 13 and extends from the bottom of the shell upwardly. Along the upper portion of the vertical baffle member 27 I provide suitable ports 28, for passing gaseous media therethrough.

Disposed adjacent the shell and above the air outlet 14 is an inclined baffle 29, which has its upper edge secured to the outer portion of the horizontal baffle 26, and adjacent its upper edge, the inclined baffle 29 is provided with a suitable number of ports 31, for passing gaseous media therethrough. The ports 31 are thus disposed, in an offset relation with respect to the air outlet 14, for the purpose of preventing condensate from falling directly through these ports and into the outlet connection 14. Likewise, it will be observed that the inclined baffle 29 is so disposed as to carry condensate falling from the tubes in the cooling chamber to the lower portion of the shell, the lowermost portion of the inclined baffle 29 being spaced from the vertical baffle 27 so as to provide a passage for such condensate, directly to the condensate outlet 13.

The baffles 26, 27 and 29 are secured to the tube support 23 and to the tube sheet 17 by means of suitable clips, or the like, 32 so that they may be removable with the tube bundle. In order to prevent gaseous media from by-passing around the outer end of the horizontal baffle 26, I bend the outer portion of this baffle slightly downwardly and place an angle iron 33 along the side of the shell, below the outer inclined portion of the horizontal baffle 26 and spaced slightly therefrom, so as to permit condensate which passes along this side of the shell to form a liquid seal at 34, between the horizontal baffle and the shell. The inclined baffle 29 also has its lowermost edge bent downwardly so that it may form a similar seal at 35, with the longitudinally disposed angle, or the like, 36. Thus, it will be seen that these liquid seals 34 and 35, together with the inclined baffle 29, the ports therein and the side of the shell define a passage from the cooling chamber to the outlet 14.

In order to prevent liquid media, such as condensate, which may pass through the liquid seal 34, from entering the air outlet 14, a longitudinally disposed angle 36′ is secured to the shell above this outlet connection. This angle 36′ preferably extends for a distance sufficient to cause a liquid flowing down the sides of the shell to pass around the ends of the angle and thus to avoid the outlet 14. A suitable notch (not shown) may be provided in the movable tube plate 19 to allow the latter to be withdrawn past the angle baffle 36′.

That portion of the cooling chamber, which extends between the movable tube sheet 19 and the tube support 23, is formed by horizontal and vertical baffle members 26′ and 27′, respectively, and by an inclined baffle member (not shown), which are similar in all respects to those just described, with the exception that provision is made for making these baffle members extensible, so that they may lengthen and shorten in response to expansions and contractions of the tube nest. These means comprise brackets 37 which are secured to the movable tube sheet 19 and carry suitable bolts, or rivets 38 which extend through slots 39 in the respective baffle members, and thus permit these members to change their length and prevent deflection.

In order to provide further support for the tubes, and to maintain the tube support 23 in proper position with respect to the tube sheets, I employ a suitable number of rigid stay members 40 between the tube support 23 and the rigid tube sheet 17, and a like number of extensible stay members 41 between the movable tube sheet 19 and the tube support 23. The extensible stay members are similar to the extensible baffle members, brackets 37 being secured to the tube sheet 19 and bolts, or the like, 42 carried by the extensible members 41, extend through slots 43 in the brackets 37 and thus permit these members to lengthen and shorten, and at the same time, a fairly rigid structure is provided for preventing undue sagging and consequent bending stresses in the tubes.

In order to provide for readily inserting and removing the tube bundle from the shell, I arrange longitudinally extending angles 44 along the inner sides of the shell so as to provide ways upon which the tube support 23 and the movable tube sheet 19 may ride. Under some conditions of service, these ways are apt to become sufficiently corroded to deprive the tube bundle of the desired freedom of movement. To avoid this condition, I dispose suitable rollers 46 on the tube sheet 19 and on the tube support 23 for reducing the friction, so that the tube bundle may be removed with a minimum of effort. It will be understood, however, that these rollers 46 may be omitted and that merely notches or the like may be provided on the tube support 23 and the movable tube sheet 19 so as to permit these members to slide along the ways 44.

In the operation of the apparatus thus far described, should it be desired for any reason to remove the tube bundle, it is merely necessary to remove the inlet water box 18 and to disconnect the rigid tube sheet 17 from the shell. This being done, the bundle may be slidden along the ways 44 and removed from the shell as a unit, the various baffles 26, 27 and 29, together with the stay members 40 and 41 being removed with the bundle. When the bundle is again inserted in the shell, it will be observed that it is unnecessary to make any threaded connections, or adjustments, and that the liquid seals are automatically formed as soon as operation of the heater is resumed.

Figure 4:
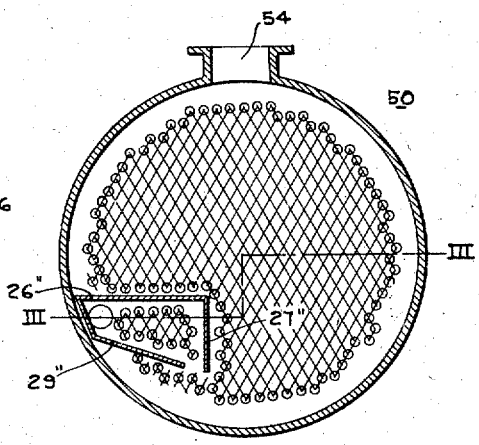
Figure 3:
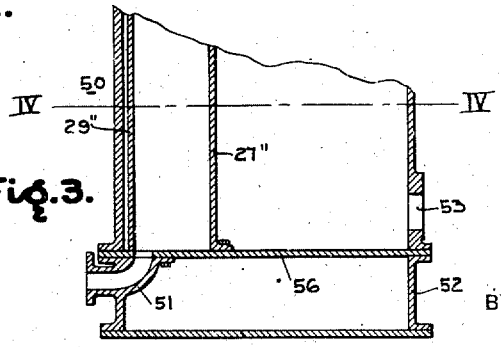
Fig. 3 is a fragmentary view showing a sectional elevation of the lower portion of a vertical type heat exchanger with the tubes removed; and, Fig. 4 is a transverse section along the line IV—IV of Fig. 3.

In Figs. 3 and 4, I show a vertical type heater 50, embodying a modified form of my invention. In a vertical type heater, it is, of course, unnecessary to provide ways such as are provided by the angle irons 44 in Figs. 1 and 2 for supporting the movable tube sheet 19 and the intermediate tube support 23. In this form of my invention, I dispense with the liquid seals and provide an air and non-condensable gas outlet 51, which extends through the inlet and discharge water box 52. The cooling chamber is formed by baffles 26″, 27″ and 29″, respectively, which are similar to the baffles 26, 27 and 28, described with reference to Figs. 1 and 2, with the exception that no ports are provided in these baffles, and that the adjacent end portions of the baffles 27″ and 29″ are spaced apart so as to provide the passage for gaseous media.

In this latter form of my invention, it will be understood that any tube support plates, which may be used, will be provided with suitable ports so as to afford communication throughout the length of the cooling chamber formed by the baffles 26″, 27″ and 29″, respectively, so that air and other non-condensable gases may be removed from all portions of the shell through the connection 51.

The shell is provided with any suitable condensate outlet 53 and with an inlet for gaseous media 54. In all other respects, the heat exchanger shown in Figs. 3 and 4 is similar to that described with reference to Figs. 1 and 2.

To remove the tube bundle from the heater, it is merely necessary to loosen the rigid tube sheet 56 from the shell. The air outlet 51 being formed in the water box 52, it is assured that there can be no leak which would permit by-passing of gaseous media from within the shell to this outlet. In this form of my invention, as well as in that shown in Figs. 1 and 2, the baffles need not be disconnected from the tube plates.

It will readily be seen, therefore, that I have provided a tubular heat exchanger which is so constructed as to permit the tube bundle to be withdrawn or inserted with a minimum of effort and inconvenience. The liquid seals around the air and non-condensable gas outlet and cooling chamber are automatically formed and provide a simple, inexpensive and yet positive means for preventing by-passing of gaseous media. By means of my invention, it is possible to remove, or to insert the tube bundle without either breaking, or making any threaded or otherwise difficult connections within the shell.

While I have shown my invention in two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:—

1. The combination with a heat exchanger comprising a shell having an inlet, and a nest of tubes within the shell, of a baffle extending within the nest of tubes, and means providing a liquid seal between the baffle and the shell.

2. The combination with a heat exchanger comprising a shell having an inlet, and a tube bundle within the shell, of a baffle extending within the tube bundle and carried thereby, and means providing a liquid seal between the baffle and the shell.

3. The combination with a heat exchanger comprising a shell having an inlet, and a tube bundle within the shell, of baffle means removable with the tube bundle and providing therein a cooling chamber for air and non-condensable gases, and means independent of said baffle means providing an air and non-condensable gas removal connection for said chamber.

4. The combination with a heat exchanger comprising a shell having an inlet, a nest of tubes within the shell, a rigid tube sheet and a movable tube sheet for the nest of tubes, and a tube support between said tube sheets, of baffles secured to said tube sheets and to the tube support, and means providing a liquid seal between the baffles and the shell.

5. A device according to claim 4, and means providing an extensible connection between the movable tube sheet and the baffle associated therewith.

6. The combination with a heat exchanger comprising a shell having an inlet, and a tube bundle within the shell, of a baffle within said tube bundle and having transversely and downwardly extending portions, means providing passages through one of said portions of said baffle, and means providing a liquid seal between one of said portions of said baffle and said shell.

7. A heat exchanger comprising a shell having an inlet, a nest of tubes within said shell, a transversely extending baffle and a substanatially vertically disposed baffle within said nest of tubes and arranged to provide a cooling chamber, means providing a liquid seal between said transversely extending baffle and said shell, means providing an air and non-condensable gas removal connection below said cooling chamber, an inclined baffle member adjacent said air and non-condensable gas removal connection, said inclined baffle member being arranged to form one wall of said cooling chamber and having ports therein in offset relation with said air and non-condensable gas removal connection, and means providing a liquid seal between said inclined baffle member and said shell.

8. The combination with a heat exchanger comprising a shell having an inlet and an air and non-condensable gas outlet and an outlet for condensate, and a nest of tubes within the shell, of a baffle extending horizontally into said nest above said air and non-condensable gas outlet, a baffle extending substantially vertically into said nest above said condensate outlet and joined to said horizontally extending baffle, an inclined baffle above said air and non-condensable gas outlet and having the lower end thereof spaced from said vertically extending baffle to provide a passage to said condensate outlet, and means providing liquid seals between said horizontally extending baffle and said shell and between said inclined baffle and said shell, said vertically extending baffle and said inclined baffle having ports therein for the passage of gaseous media.

9. A device according to claim 8, and means on said shell independent of said aforementioned baffles for preventing liquid media from passing from said shell through said air and non-condensable gas outlet.

10. A device according to claim 8, and means for permitting the removal of said baffles and said tube from said shell as a unit.

11. The combination with a heat exchanger comprising a shell having an inlet and a condensate outlet and an air and non-condensable gas outlet, and a nest of tubes within the shell, of means for enclosing a portion of said tube nest into a separate compartment, and means including liquid seals for defining a passage from said compartment to said air and non-condensable gas outlet.

12. The combination with a heat exchanger comprising a shell structure having an inlet for gaseous media and an outlet for condensate and a tube bundle within the shell structure, of a baffle structure embodied in the tube bundle, means for supporting the tube bundle and baffle structure within the shell structure and providing for the removal thereof from the shell structure, and means including a portion of the baffle structure for forming a liquid seal between the baffle structure and the shell structure when the tube bundle and baffle structure are disposed in the shell structure.

13. The combination with a heat exchanger comprising a shell structure having an inlet for gaseous media and separate outlets for condensed media and non-condensed media and a tube bundle disposed within the shell structure, of a baffle structure carried by the tube bundle and defining a non-condensable media cooling chamber communicating with the non-condensable media outlet, means for supporting the tube bundle and baffle structure within the shell structure and providing for the removal thereof from the shell structure, and means including a portion of the baffle structure for forming a liquid seal between the baffle structure and the shell structure so as to maintain the non-condensed media outlet in sole communication with the cooling chamber.

14. The combination with a heat exchanger comprising a shell structure having an inlet for gaseous media and separate outlets for condensed and non-condensed media and a tube bundle disposed within the shell structure, of a baffle structure carried by the tube bundle and dividing the latter into a condensing portion communicating with the condensable media outlet and a cooling portion communicating with the non-condensable media outlet, means for supporting the tube bundle and baffle structure within the shell structure and providing for the removal thereof from the shell structure, and means including a portion of the baffle structure for forming liquid sealing means between the condensing portion of the tube bundle and the non-condensed media outlet provided in the shell structure.

15. The combination with a heat exchanger comprising a shell structure having an inlet for gaseous media and separate outlets for condensed media and non-condensed media and a tube bundle disposed within the shell structure, of a baffle structure embodied in the tube bundle and carried thereby, said baffle structure dividing the tube bundle into a condensing portion communicating with the condensed media outlet and a cooling portion communicating with the non-condensed media outlet supports for the tube bundle and the baffle structure, said supports engaging the inner wall of the shell structure and providing for the removal of the tube bundle and the baffle structure from the shell structure, and means carried by the shell structure and cooperating with the baffle structure to provide a liquid seal between the condensing portion of the tube bundle and the non-condensable media outlet.

In testimony whereof I have hereunto subscribed my name this 16th day of April, 1929.

JOHN P. RATHBUN.